June 7, 1927.
E. KIMURA
1,631,273
VEHICLE TRAFFIC SIGNAL
Filed May 20, 1926
2 Sheets-Sheet 1
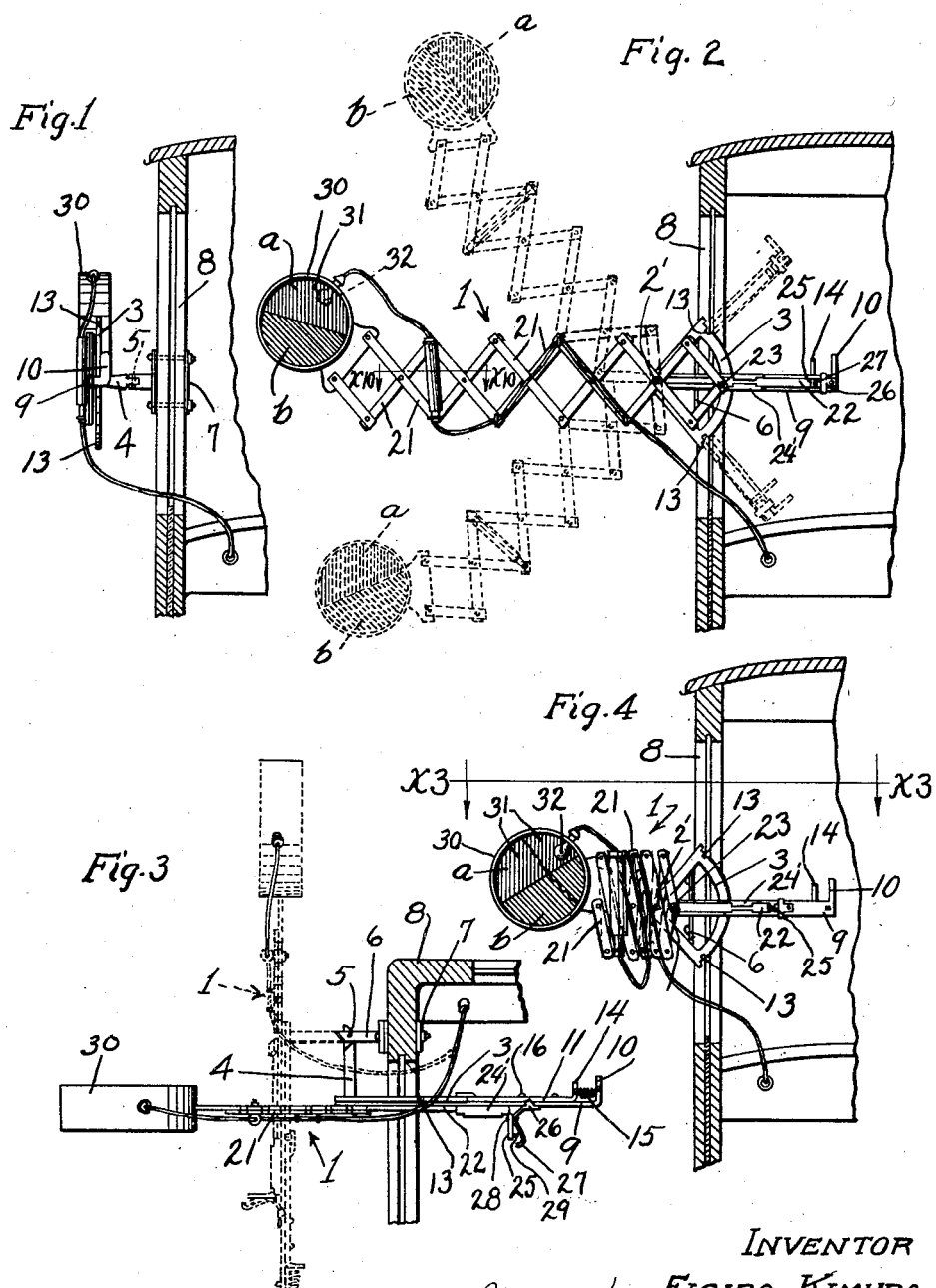
INVENTOR
EIGIRO KIMURA
by James R. Townsend
his atty
WITNESS
Robt. S. Woolsey

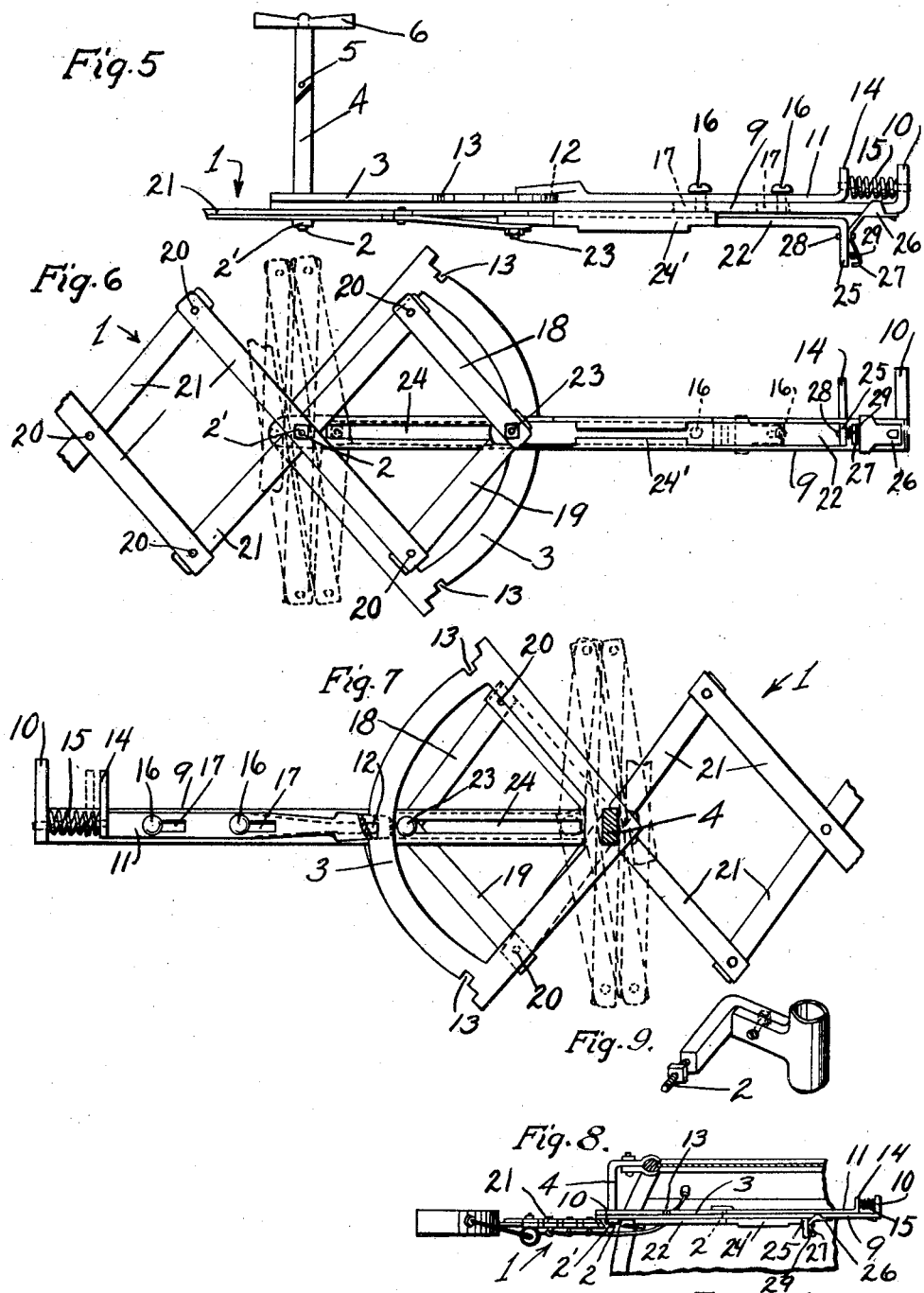

Patented June 7, 1927.

1,631,273

UNITED STATES PATENT OFFICE.

EIGIRO KIMURA, OF SAN PEDRO, CALIFORNIA.

VEHICLE TRAFFIC SIGNAL.

Application filed May 20, 1926. Serial No. 110,376.

An object of this invention is to provide for day and night use, a novel direction indicator applicable to either closed or open cars, and I make provision whereby the invention may be readily applied and easily extended and retracted.

The invention is adapted to be mounted on various supports and may be used for signals at street intersections or elsewhere. It may be also applied to street cars and interurban cars electrically or otherwise driven.

It may be operated by hand or by electrically actuated mechanism, but it is sufficient for the purpose of this application to show the invention as constructed for use on automobiles and like vehicles.

The invention comprises a lazy tongs, a signalling device at the outer end of the lazy tongs, a support, a lever pivoted to the support, a lazy tongs operating member, means pivoting two members of the lazy tongs to the lever and means pivoting two other members of the lazy tongs to the lazy tongs operating means so that the lazy tongs may be extended or retracted at different angles to the horizontal.

Other objects, advantages and features of invention may appear from the accompanying drawings, the subjoined detail description and the appended claims.

The accompanying drawings illustrate the invention.

Figure 1 is a fragmental view of the signal in collapsed position on a closed automobile and ready to be brought into signaling position.

Fig. 2 is a view showing the invention in position indicating a left turn. The positions for right turn and stop are indicated in broken lines, omitting the inner ends of the lazy tongs.

Fig. 3 is a plan viewed from line $x^3$—$x^3$, Fig. 4, showing the device retracted from the solid line position shown in Fig. 2; broken lines indicate the position when the device is fully collapsed and turned to minimize its projection from the automobile.

Fig. 4 is a rear elevation of what is shown in solid lines in Fig. 3.

Fig. 5 is an enlarged plan view of the operating handle of the traffic direction signal.

Fig. 6 is an enlarged rear elevation of the signal operating handle, with fragments of lazy tongs extended in solid, and retracted in dotted lines.

Fig. 7 is an enlarged front elevation of the signal operating handle and lazy tongs as shown in Fig. 6.

Fig. 8 is a plan view to show the signal attached to an open car and in retracted position.

Fig. 9 is a perspective view of the device used to attach the signal to the windshield.

The lazy tongs 1 is pivoted by the pivot bolt 2 to the center of a segment 3 that is fixed to a pivot post 4 which is hinged on a vertical axis 5 to a bracket 6 that is fixed by any suitable clamping means 7 to the frame 8 of the vehicle.

9 is a lever pivoted to the center of the segment 3 and to the post 4 by the pivot 2 to which it is secured by a nut 2'.

10 is a handle on the lever 9, and 11 is a spring-actuated latching slide provided with a detent 12 adapted to engage in notches 13 in the arc of the segment. The latch slide is provided with a handle 14 and is normally held in engaging position by a spring 15.

Said slide may be secured to the lever in any desired way, and is shown as being so secured by rivets 16 passing through slots 17 in the slide 11 and fixed to the lever 9 so that by drawing the slide handle 14 toward the lever handle 10, the latch will be released and the lever may be turned with relation to the fixed segment, thus moving the lazy tongs to any desired angle.

The operating links 18, 19 at the inner end of the lazy tongs are connected in the usual way by pivots 20 with the lazy tong members 21, which are pivoted to each other at the middle and to the post 4 by the pivot 2 fixed to said post.

22 is a lazy tongs operating rod connected to the end links of the lazy tongs by a bolt pivot 23 that extends through a slot 24 in the lever 9 and that pivots the terminals of the links 18, 19 to the operating rod 22; the terminals of said links being disposed on opposite sides of rod 22 so that as said rod is slid along the slideway 24', the links 18, 19, will be moved to extend and retract the lazy tongs.

The connecting rod 22 is provided with a connecting rod handle 25 having a spring operated connecting rod latch 26 having a thumb piece 27 and fulcrumed at 28 to the handle 25 so that by pressing upon the thumb piece 27 to compress the spring 29, the latch 26 will be released from the lever 9 and the operating rod 22 can be slid to extend or retract the lazy tongs.

30 indicates the opaque frame of a lamp holder having face plates 31 that may be colored and translucent and may be spaced apart to contain a lamp 32 to illuminate the translucency; there being like translucent plates, both at the front and the back faces of the lamp holder. Likewise, the face plates may bear traffic designations such as the words, Stop, Go or Turn.

The driver of a closed car provided with this invention can bring the signal into collapsed position shown in Fig. 3 by retracting the lazy tongs and swinging the lever out away from the open window of the closed car; and in that position the signal is not prominent from either front or back.

When it is desired to give a direct signal, the operator will draw the handle 9 in and will operate the signal operating rod to throw the signal out into extended position. This may be easily done while the handle is level or when it is inclined downward and outward; and when it is extended, the operator may release the latching detent 12 by sliding the handle 10 along the lever.

The operator will release the latch 26 when he wishes to withdraw the signal, by operating the lazy tongs and allowing the latch 26 to clutch the lever when the signal holder is properly extended.

When the lever has been appropriately adjusted on the arc of the segment, the detent 12 of latch 11 may be allowed to seat in the notches 13 of the segment, thus fixing the indicating angle of the lazy tongs.

The translucent faces of the signal may be parti-colored, one part being red and the other green, for example, as indicated at $a$ and $b$ in the drawing; but it is understood that any color or colors may be selected in accordance with the judgment and convenience of the constructor.

I claim:—

1. The combination with the lazy tongs and a signal thereon of a sector having a notched arc; a pivot post to which the sector is fixed; a bracket on which the pivot post is hinged on a vertical axis; a lever pivoted to the center of the sector and to the post; a handle on the lever; a spring actuated latch provided with a detent adapted to engage the notches in the arc of the sector; a handle for the latch, a spring to hold the latch normally in arc engaging position and said lazy tongs adapted for adjustment to dispose said segment at right angles to said post.

2. The combination with a lazy tongs provided with a signal at an outer end and comprising operating links at the inner end, a post adapted for attachment to a vehicle and to which said operating links are pivoted; a slotted lever; a bolt extending through the slot in the lever and pivoting the lazy tongs operating rod to the end links of the lazy tongs, the terminals of the links being disposed on opposite sides of the operating rod so that as said rod is slid along the lever the links will be moved to extend and retract the lazy tongs and said signal adapted to be retracted to dispose the same in vertical alinement with the side of the vehicle.

In testimony whereof, I have hereunto set my hand at Los Angeles, California, this 1st day of May, 1926.

EIGIRO KIMURA.